United States Patent [19]

Mannella

[11] Patent Number: 4,473,607
[45] Date of Patent: Sep. 25, 1984

[54] WALKING-BEAM BILLET CARRIER TILE

[76] Inventor: Gary R. Mannella, 3190 Central, Milford, Mich. 48042

[21] Appl. No.: 396,937

[22] Filed: Jul. 9, 1982

[51] Int. Cl.³ .......................... B32B 3/02; F23M 5/04
[52] U.S. Cl. ....................................... 428/60; 52/605; 52/608; 428/57; 428/156; 428/167
[58] Field of Search .................. 428/156, 167, 44, 57, 428/60, 577; 52/605–608; 110/338; 432/118, 119

[56] References Cited
U.S. PATENT DOCUMENTS 300,521  6/1884  Smith ..................................... 52/605
979,604 12/1910  Turner ................................... 52/608

Primary Examiner—Paul J. Thibodeau
Attorney, Agent, or Firm—Krass & Young

[57] ABSTRACT

A walking-beam carrier for steel billets comprising a steel channel covered by blocks of refractory material having billet seats formed by transverse grooves. The blocks are dimensioned such that when placed in an end to end linear array and separated by mortar joints, the grooves are evenly spaced and compatible with the throw length of the walking-beam mechanism. Alignment slots are formed in the flats between grooves in the top surfaces of the block to facilitate installation.

9 Claims, 4 Drawing Figures

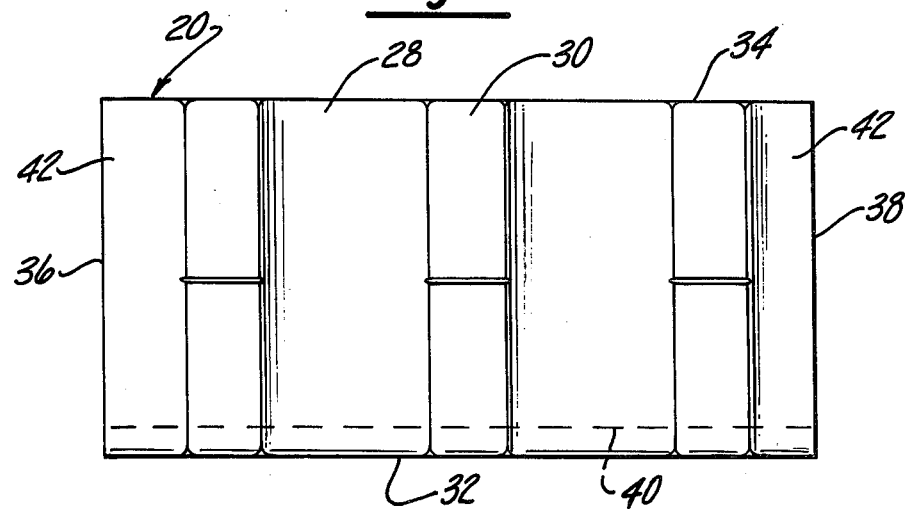
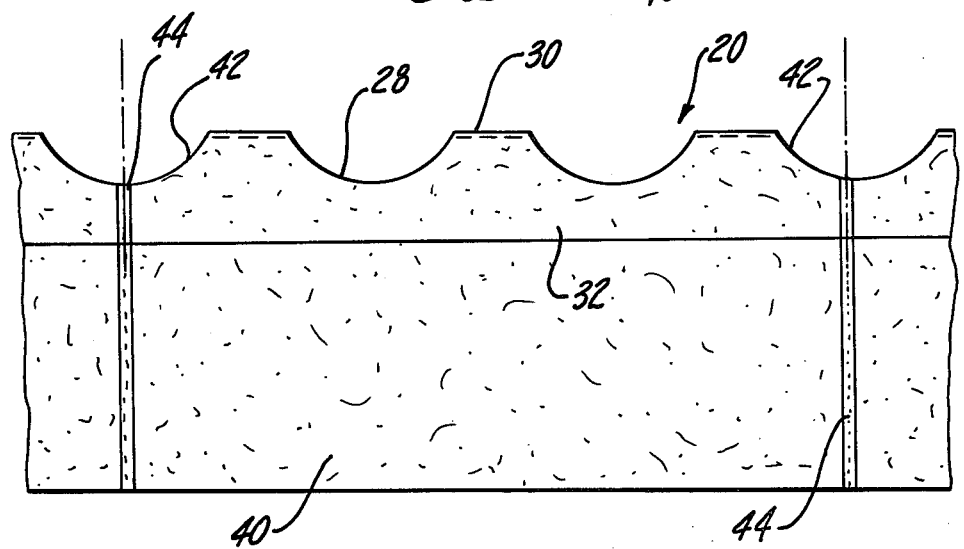

WALKING-BEAM BILLET CARRIER TILE

TECHNICAL FIELD

This invention relates to industrial furnaces of the type using a walking-beam mechanism to move metal billets or the like through the furnace in intermittent fashion. The invention relates more particularly to the construction and configuration of a refractory block which may be used to cover and protect the walking-beam mechanism as well as to construct stationary side support surfaces so as to provide spaced apart stable support locations for the metal billets as they progress through the furnace.

BACKGROUND OF THE INVENTION

It is known to use large corridor type furnaces for preheating billets of steel or other metals prior to some industrial operation such as rolling or hot forming. Such furnaces typically utilize walking-beam carriers to cause a group of billets to progress through the furnace in intermittent or stepwise fashion. In this arrangement the billets are placed in spaced-apart parallel fashion with their axes transversely of the furnace and the walking-beam mechanism lies generally in the center of the furnace so as to pick up a group of billets and move them forward by six or eight inches depending upon the throw length of the walking-beam mechanism.

The walking-beam mechanism may, for example, comprise a long channel shaped steel body which is covered or lined with refractory tiles or blocks. The blocks themselves are preferably configured in such a fashion as to provide stable support locations or seats for the billets both in the rest positions at opposite ends of the throw and on the walking-beam carrier itself so that the billets do not move around or become misaligned during the throw.

One known technique for providing the aforementioned support locations or seats involves lining the walking-beam carrier surface as well as laterally adjacent support surfaces with refractory blocks of staggered height, the shorter blocks forming rectangular troughs or recesses into which the billets fall at opposite ends of the walking-beam carrier throw. Another known arrangement involves development such as by casting of liner blocks having a sawtooth top surface configuration to provide the support locations or seats. In one known installation the channel shaped carrier is notched along the side surfaces to conform to the sawtooth configuration of the refractory blocks.

In all of the known installations, significant problems are encountered in maintaining the proper spacing between the support locations or seats so that in all cases they are spaced apart by the throw length of the walking-beam mechanism. In addition problems are encountered in installation and later use where the blocks are very small; i.e., a large number of blocks requires a great deal of mortar work in installation and the presence of a large number of mortar joints not only contributes to the aforementioned dimensional and spacing problems but also to maintenance.

BRIEF SUMMARY OF THE INVENTION

The subject invention provides an improved refractory block or tile for covering walking-beam mechanisms in preheating furnaces for metal billets and the like and also for generating side support surfaces in cooperative relationship with the walking-beam mechanism. In addition, the invention provides an improved refractory lined or covered walking-beam mechanism which is characterized by accurate spacing between support locations or seats and substantially facilitated installation.

In general, a block which is constructed in accordance with the invention to be used in a linear arrangement exhibits a generally rectoidal shape having a top surface, opposite side surfaces and opposite end surfaces, the top surface having at least one transversely extending semi-circular groove formed therein, the overall length of the block being such that when two or more of the blocks are linearly arranged with the end surfaces thereof parallel but spaced apart by a mortar joint, the distances between any two adjacent grooves are equal and compatible with the throw length of a walking beam mechanism.

BRIEF DESCRIPTION OF THE DRAWINGS

FIG. 3 is a top view of the refractory block of FIG. 2; and

FIG. 4 is a side view of the refractory block of FIG. 2 indicating the cooperative relationship between a series linearly-arranged blocks as installed, for example, on a walking-beam carrier.

DETAILED DESCRIPTION OF THE SPECIFIC EMBODIMENT

Figure 1:
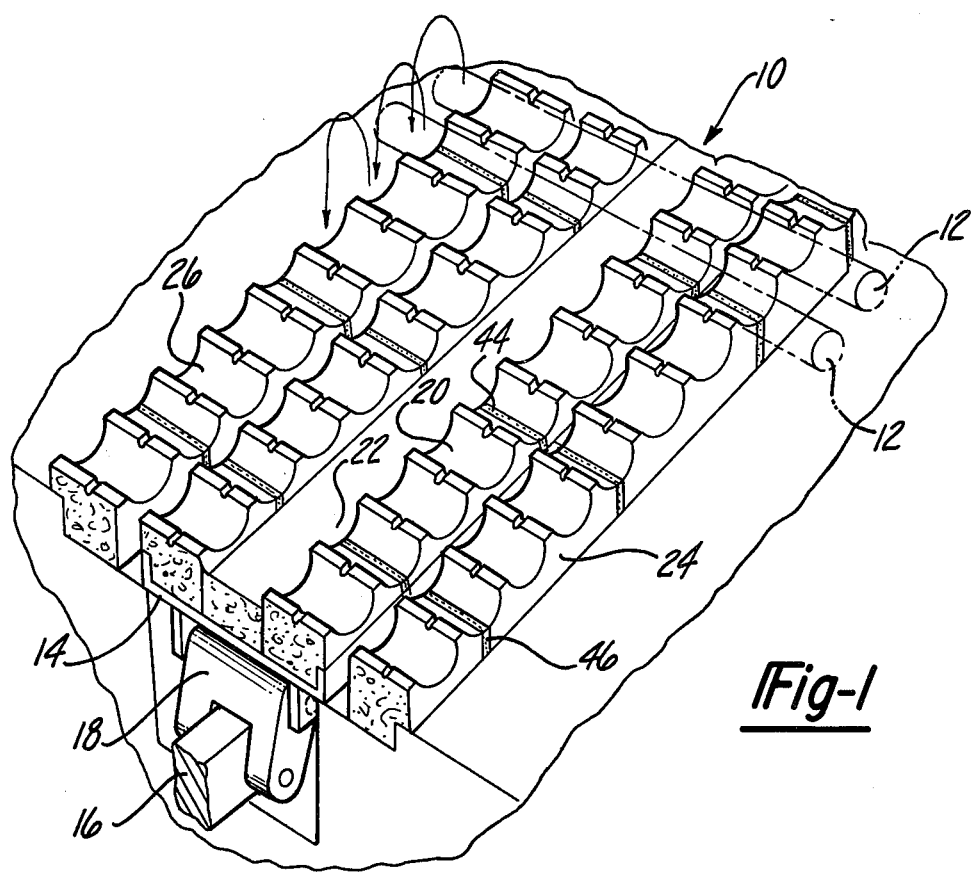
FIG. 1 is a perspective view of a walking-beam carrier for use in a billet-heating furnace.

Referring to FIG. 1 a walking-beam mechanism 10 for use in a preheating furnace for cylindrical or rod shaped steel billets 12 is shown to comprise a channel shaped steel walking-beam carrier to form 14 connected to a suitably driven beam 16 by means of links 18 to cause the billets 12 to move stepwise through the furnace. In accordance with the invention, the walking-beam form 14 is covered or lined with two parallel rows of refractory blocks 20 separated by a concrete or refractory spacer 22. Stationary side support structures 24 and 26 are formed by additional rows of refractory blocks adjacent but transversely spaced from the blocks 20 on the walking-beam form 14. All of the blocks, both on the walking-beam mechanism 10 and on the stationary side support surfaces are provided with semi-circular grooves which are spaced apart by the throw length of the walking-beam mechanism. In addition the grooves formed by the blocks on the beam form 14 are aligned with the grooves on the stationary side support structures 24 and 26 at the opposite termini of the walking-beam throw such that each billet 12 may be lifted out of the support location or seat as the beam rises and placed into the next adjacent support location as the beam falls.

Looking now to FIGS. 2 through 4, a block 20 which is constructed in accordance with the invention will be described in detail. Each block 20 is cast of a suitable refractory material such as concrete having a high aluminum oxide content reinforced by high alloy steel needles so as to exhibit a generally rectoidal shape. The block 20 exhibits in the top surface thereof a plurality of semi-circular grooves 28 and intermediate flats 30 which extend transversely across the block so as to intercept the opposite side surfaces 32 and 34. Block 20 further exhibits opposite parallel end surfaces 36 and 36 which are placed in spaced apart face to face relationship in a linear array such as is shown in FIG. 1, said surfaces being joined by a mortar joint 44 of approximately one-quarter inch thickness. Side surface 32 is relieved or undercut to provide a recessed surface 40 the upper extremity of which defines a ledge which overlies the side channel portions of the form 14 as shown in FIG. 1.

Figure 2:
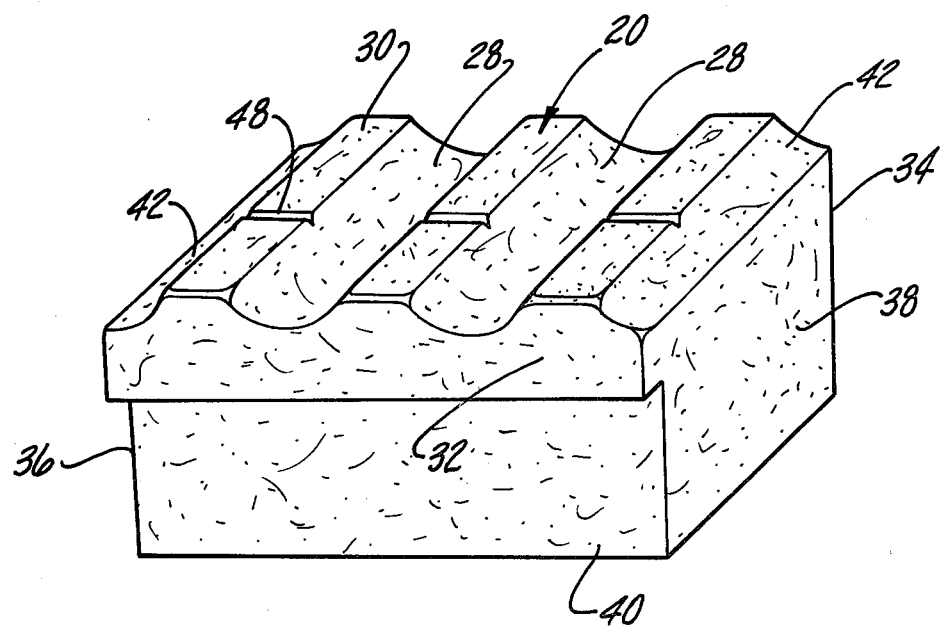
FIG. 2 is a perspective view of a refractory block constructed in accordance with the invention.

In addition to the two full semi-circular grooves 28 as shown in FIGS. 2 through 4, block 20 is further provided with partial grooves 42 at the opposite longitudinal ends thereof, the grooves 42 intercepting the end surfaces 36 and 38 such that when two or more of the blocks 20 are placed in end to end relationship and joined by a mortar joint, the partial grooves 42 form complete grooves and, in combination with the mortar joint 44, maintain the regular even spacing of the support locations for the billets 12. Similar mortar joints 46 are formed between the blocks in the side support structures 24 and 26.

Alignment slots 48 are preferably formed in the flats 30 so as to extend longitudinally of the blocks 20 to facilitate alignment during the installation process; i.e., a wire or laser beam aligned with the longitudinal axis of the furnace may be used as a reference passing through the slots 48 make sure that all of the blocks 20 in a given linear array line up with one another and are parallel to the similarly arrayed blocks of the adjacent structures.

As is apparent in FIGS. 2 through 4 the term "semicircular" as used herein is to be construed to mean a partial circle or arcuate surface which is less than a half circle but deep enough to provide the aforementioned stable support or seating function for the billets 12. The radius of the grooves 28 is preferably slightly larger than that of the billets 12 to provide a certain amount of dimensional tolerance and also to provide a self centering or seating function. In a typical installation, the throw length is six inches and the blocks 20 are cast so as to be seventeen and three-quarters inches in overall length. In combination with a standard one-quarter inch mortar joint, the result is a linear array in which the distances between any two adjacent grooves 28 is exactly six inches. In the arrangement of FIG. 1 the blocks are approximately nine inches in transverse dimension and nine inches in height. Although solid blocks are shown, a reduction in material may be realized by forming hollows in the bottom surfaces thereof as may be required or desired in any given installation arrangement. The edges of the block 20 adjacent the grooves 28 and flats 30 are radiused as best shown in FIG. 2 to prevent spalling and also to facilitate the self-seating function; i.e., if the billet lands on a block 20 slightly askew, the radius tends to capture the billet and recenter it in the blocks formed both on the walking-beam form 14 and in the side support structures 24 and 26.

The blocks are preferably manufactured by casting a ceramic material having up to forty-five percent aluminum oxide and firing the resulting structure at 750° fahrenheit or more. Preferably the mix contains approximately three to five percent by weight stainless steel needles of approximately one inch length and 0.020 inch diameter in a random array to increase strength.

While the invention has been described with reference to a specific embodiment it is to be understood that the various modifications may be made within the spirit and scope of the appended claims.

I claim:

1. A refractory surfaced walking-beam carrier for billets or the like comprising:

a generally channel-shaped walking-beam form, in the form in linear array and spaced apart by mortar joints, each of the refractory blocks being of generally rectoidal shape and having a top surface, opposite end surfaces abutting the mortar joints and opposite side surfaces, the top surface having formed therein a plurality of transverse billet-receiving grooves which extend between and intercept the side surfaces, each of said blocks having a recessed side surface portion to receive the channel-shaped form;

the length of said blocks and mortar joints being such that the grooves are evenly spaced apart by the throw length of the walking beam.

2. Apparatus as defined in claim 1 further including stationary side support structures adjacent each side of the walking-beam form and having transverse grooves formed therein in alignment with the grooves of the blocks in the beam form at the termini of the throw thereof.

3. Apparatus as defined in claim 1 wherein each of the blocks has flats forming a part of said top surface and lying between said grooves.

4. Apparatus as defined in claim 3 wherein each of the blocks has flats formed between the grooves and an alignment slot extending longitudinally in each flat.

5. A carrier for cylindrical billets in a furnace comprising:

support means defining an elongated channel area;

at least two blocks of refractory materials disposed on the support means in end-to-end relationship along the channel area and having a mortared joint therebetween;

each block exhibiting a generally rectoidal shape defining an exposed top surface, opposite side surfaces and opposite end surfaces;

the top surfaces having formed therein at least one transverse groove of semi-circular configuration and of a radius which is at least slightly larger than the radius of a cylindrical billet to be placed therein, said grooves extending between and intercepting the side surfaces of the block; said grooves being bounded by contiguous and intervening flats which form a part of said top surface;

the overall length of said blocks being such that two or more such blocks in linear and mortared arrangement in said channel area provide equal distances between any two adjacent grooves.

6. Apparatus as defined in claim 5 wherein the top surface of each groove has formed therein, in addition to said at least one groove, at least one partial groove parallel to said one groove and terminally intercepting an end surface whereby said two blocks in end-to-end relationship and spaced by a mortar joint define an additional complete groove.

7. Apparatus as defined in claim 5 wherein each block has one side surface thereof recessed over part of the elevation thereof to form a ledge, said support means has at least one side flange, said ledge cooperating with said side flange for the secure support of said block.

8. Apparatus as defined in claim 5 wherein each of the top surfaces exhibit at least two grooves and a flat contiguously between the grooves, and an alignment slot formed in the flat and extending longitudinally of the block.

9. Apparatus as defined in claim 5 wherein the intersections between the top surface and at least one side surface of each block is radiused.

* * * * *